Figure 1:
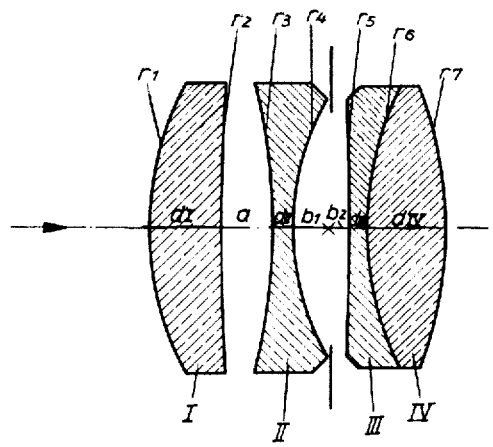

United States Patent Office 2,732,762
Patented Jan. 31, 1956

2,732,762

WIDE APERTURE PHOTOGRAPHIC OBJECTIVE COMPRISING THREE AIR SPACED COMPONENTS

Günther Lange, Konigsbronn, Wurttemberg, and Robert Richter, Heidenheim (Brenz), Germany, assignors to Carl Zeiss, Heidenheim (Brenz), Germany Application June 9, 1952, Serial No. 292,504

Claims priority, application Germany June 12, 1951

3 Claims. (Cl. 88—57)

Photographic objectives are known, which consist of three elements separated from one another by air spaces, that is, of a simple collective meniscus front lens, a simple biconcave middle lens and a collective rear element which is composed of a biconvex element cemented to a dispersive element, both elements of opposite refractive power and a collective cemented surface convex to the incident light. The invention concerns in particular objectives of this structural type, in which the air separation between the first and the second lens is less than the air separation between the second and the cemented element. Such objectives, in so far as the relative aperture is not too great, are characterized by a high sharpness of image over the entire image field. With greater relative aperture, residual errors appear, especially coma with the more strongly inclined pencils, which impair the image sharpness. According to the invention this can be avoided also with relative apertures up to at least 1:3.5, if at the same time in the rear element said collective cemented surface is convex to the incident light and if the following conditions are fulfilled simultaneously $$0.3 \cdot f < r_1 < 0.5 \cdot f$$
$$2 \cdot f < r_2 < 10 \cdot f$$
$$0.9 \cdot L < r_6 < 1.25 \cdot L$$
$$0.33 \cdot f < r_6 < 0.50 \cdot f$$
$$0.30 \cdot f < L < 0.42 \cdot f$$
$$0.85 \cdot f < r_1 + |r_7| < f$$
$$0.055 < n_I - n_{II} < 0.1$$
$$0.1 < n_{IV} - n_{III} < 0.25$$
$$1.64 < n_I < 1.84$$

f being the focal length and
L being the axial overall length of the objective,
$r_1$ being the radius of the front surface of the front meniscus,
$r_2$ being the radius of the rear surface of the front meniscus,
$r_6$ being the radius of the cemented surface of the rear component,
$r_7$ being the radius of the rear surface of the rear component.
$n_I$, $n_{II}$, $n_{III}$, $n_{IV}$ being the refractive indices of the single elements counted in the direction of the incident light.

A relatively weak meniscus already suffices to keep the residual errors sufficiently small. It is advantageous to make the radius of curvature of the posterior surface of the meniscus less than the 10 fold of the objective focal length. In order to keep also the astigmatic errors in such an objective with greater relative aperture sufficiently small, it is advisable to select for the middle lens an $n_d$ value at least by 0.055 smaller than the $n_d$ value of the front lens, in addition to take the difference of the $n_d$ values of the two cemented lenses greater than 0.1, and at the same time also make the radius of the cemented surface greater than the 0.9 fold of the over-all length of the objective.

Figure 2:
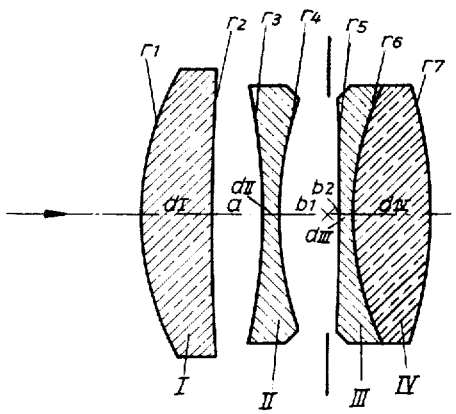

Two types of objectives with which our invention has proven to be particularly useful are illustrated in the accompanying drawing in which:

Fig. 1 and 2 each shows an objective incorporating the invention.

Throughout this specification and the accompanying claims, the usual convention of signs is employed, namely: a surface which is convex to the incident light has a positive radius of curvature, a concave surface has a negative radius of curvature, the available field of view may be defined as the angle subtended at the rear Gauss point.

The difficulties involved in the design of any objective are known to those skilled in the art. By choosing and balancing certain arrangement of elements, certain indices of refraction, certain dispersive powers, certain radii for the individual lenses, and certain lens thicknesses and air spacings, we are able to get an objective more highly corrected over a large field. Furthermore, we have taken into consideration the fact that in addition to the variations in astigmatism on the principal rays with angle of incidence, there is, for each such angle, another variation in astigmatism with the spherical aberration occurring at that angle.

The following numerical values and the accompanying drawing refer to two examples of the invention, which are both computed for a relative aperture of 1:2.8. The available field of view for both examples amounts to 52°. The stated values for the radii r and thickness d and the distances a and b between the lenses apply to a focal length of the objective of about 100 mm.

Example 1 (Fig. 1)

|  |  | $n_d$ | V |
|---|---|---|---|
| $r_1 = +$ 39.24 | $d_I = 10.2$ | 1.69467 | 55.0 |
| $r_2 = +1496.2$ | $a = 6.0$ |  |  |
| $r_3 = -$ 76.08 |  |  |  |
| $r_4 = +$ 33.47 | $d_{II} = 2.8$ | 1.62588 | 35.6 |
|  | $b_1 = 4.4$ |  |  |
| $r_5 = -$ 668.34 | $b_2 = 3.0$ |  |  |
| $r_6 = +$ 40.39 | $d_{III} = 2.3$ | 1.52944 | 51.8 |
| $r_7 = -$ 51.58 | $d_{IV} = 9.5$ | 1.69467 | 55.0 |

Example 2 (Fig. 2)

|  |  | $n_d$ | V |
|---|---|---|---|
| $r_1 = +$ 37.91 | $d_I = 9.9$ | 1.69100 | 54.8 |
| $r_2 = +$ 600.84 | $a = 6.0$ |  |  |
| $r_3 = -$ 80.12 |  |  |  |
| $r_4 = +$ 33.30 | $d_{II} = 2.1$ | 1.62536 | 35.6 |
|  | $b_1 = 6.5$ |  |  |
| $r_5 = +4441.23$ | $b_2 = 1.4$ |  |  |
| $r_6 = +$ 38.46 | $d_{III} = 1.8$ | 1.58144 | 40.8 |
| $r_7 = -$ 55.11 | $d_{IV} = 9.6$ | 1.71700 | 47.9 |

The refractive surfaces are considered in the order encountered with the incident light. The surfaces and their radii of curvature are designated with $r_1, r_2 \ldots r_7$; the thicknesses of the elements $d_I, d_{II} \ldots d_{IV}$; and the spacings $a$, $b_1$, $b_2$ in the usual way and as shown in the drawing. The refractive numbers for the $d$-line of the visible spectrum are designated $n_d$ and the Abbe numbers viz. the dispersive powers V.

We claim:

1. A highly corrected photographic objective with a relative aperture of at least f:3.5 of the type having two collective components spaced axially on opposite sides of a biconcave element in which type the front collective component is a single meniscus element, the rear collective component is compound consisting of a biconvex element cemented to a dispersive element both elements of opposite refractive power, the air separation between the said front collective component and the said biconcave middle element being smaller than the air separation between the said biconcave middle element and the said rear collective component, and the cemented surface included between the elements in the rear component being collective and convex towards the said front component, and the following conditions being fulfilled simultaneously:

$$0.3 \cdot f < r_1 < 0.5 \cdot f$$
$$2 \cdot f < r_2 < 10 \cdot f$$
$$0.9 \cdot L < r_6 < 1.25 \cdot L$$
$$0.33 \cdot f < r_6 < 0.50 \cdot f$$
$$0.30 \cdot f < L < 0.42 \cdot f$$
$$0.85 \cdot f < r_1 + |r_7| < f$$
$$0.055 < n_I - n_{II} < 0.1$$
$$0.1 < n_{IV} - n_{III} < 0.25$$
$$1.64 < n_I < 1.84$$

$f$ being the focal length and
$L$ being the axial overall length of the objective,
$r_1$ being the radius of the front surface of the front meniscus,
$r_2$ being the radius of the rear surface of the front meniscus,
$r_6$ being the radius of the cemented surface of the rear component,
$r_7$ being the radius of the rear surface of the rear component,
$n_I, n_{II}, n_{III}, n_{IV}$ being the refractive indices of the single elements counted in the direction of the incident light.

2. A highly corrected photographic objective according to claim 1, the refractive power ($\Delta n/r$) differing at most $\pm 0.5 \cdot f$ and the thickness ($d$) and air separations ($a$, $b$) differing at most $\pm 0.05/f$ from the values of the following example:

| Radii | Thickness and Separation | $n_d$ | V | $\Delta n/r$ |
|---|---|---|---|---|
| $r_1 = + 39.24$ | $d_I = 10.2$ | 1.69467 | 55.0 | +0.017703 |
| $r_2 = +1496.2$ | | | | −0.000464 |
| | $a = 6.0$ | | | |
| $r_3 = − 76.08$ | | | | −0.008227 |
| | $d_{II} = 2.8$ | 1.62588 | 35.6 | |
| $r_4 = + 33.47$ | | | | −0.018700 |
| | $b_1 = 4.4$ | | | |
| | $b_2 = 3.0$ | | | |
| $r_5 = −668.34$ | | | | −0.000792 |
| | $d_{III} = 2.3$ | 1.52944 | 51.8 | |
| $r_6 = + 40.39$ | | | | +0.004091 |
| | $d_{IV} = 9.5$ | 1.69467 | 55.0 | |
| $r_7 = − 51.58$ | | | | +0.013468 | the values for the radii ($r_1 \ldots r_7$), thickness ($d_I \ldots d_{IV}$) and separations ($a$, $b_1$, $b_2$) being given in millimeter for a focal length $f=100$ mm., $n_d$ being the refractive indices, V being the Abbe number of the glass materials of the resp. lens elements and $\Delta n/r$ being the refractive power of each individual refractive surface.

3. A highly corrected photographic objective according to claim 1, the refractive power ($\Delta n/r$) differing at most $\pm 0.5 \cdot f$ and the thickness ($d$) and air separations ($a$, $b$) differing at most $\pm 0.05/f$ from the values of the following example:

| Radii | Thickness and Separation | $n_d$ | V | $\Delta n/r$ |
|---|---|---|---|---|
| $r_1 = + 37.91$ | $d_I = 9.9$ | 1.69100 | 54.8 | +0.018227 |
| $r_2 = + 600.84$ | | | | −0.001150 |
| | $a = 6.0$ | | | |
| $r_3 = − 80.12$ | | | | −0.007805 |
| | $d_{II} = 2.1$ | 1.62536 | 35.6 | |
| $r_4 = + 33.30$ | | | | −0.018780 |
| | $b_1 = 6.5$ | | | |
| | $b_2 = 1.4$ | | | |
| $r_5 = +4441.23$ | | | | +0.000131 |
| | $d_{III} = 1.8$ | 1.58144 | 40.8 | |
| $r_6 = + 38.46$ | | | | +0.003525 |
| | $d_{IV} = 9.6$ | 1.71700 | 47.9 | |
| $r_7 = − 55.11$ | | | | +0.013010 | the values for the radii ($r_1 \ldots r_7$), thickness ($d_I \ldots d_{IV}$) and separations ($a$, $b_1$, $b_2$) being given in millimeter for a focal length $f=100$ mm., $n_d$ being the refractive indices, V being the Abbe number of the glass materials of the resp. lens elements and $\Delta n/r$ being the refractive power of each individual refractive surface.

References Cited in the file of this patent

UNITED STATES PATENTS

| | | |
|---|---|---|
| 721,240 | Rudolph | Feb. 24, 1903 |
| 1,741,947 | Merte | Dec. 31, 1929 |
| 1,849,681 | Merte et al. | Mar. 15, 1932 |
| 2,158,178 | Frederick et al. | May 16, 1939 |
| 2,165,328 | Aklin et al. | July 11, 1939 |
| 2,308,007 | Herzberger et al. | Jan. 12, 1943 |
| 2,573,512 | Tronnier | Oct. 30, 1951 |

FOREIGN PATENTS

| | | |
|---|---|---|
| 577,763 | Great Britain | May 30, 1946 |
| 583,984 | Great Britain | Jan. 3, 1947 |

UNITED STATES PATENT OFFICE
CERTIFICATE OF CORRECTION

Patent No. 2,732,762                          January 31, 1956

Günther Lange et al.

It is hereby certified that error appears in the printed specification of the above numbered patent requiring correction and that the said Letters Patent should read as corrected below.

Column 1, line 37, and column 3, line 16, for "$2 \cdot f < r_2 < 10 \cdot f$", each occurrence, read -- $2 \cdot f < r_2 < 15 \cdot f$ --.

Signed and sealed this 6th day of September 1960.

(SEAL)
Attest:

ERNEST W. SWIDER                                          ROBERT C. WATSON
Attesting Officer                                               Commissioner of Patents